US009176563B2

(12) United States Patent
Jung (10) Patent No.: US 9,176,563 B2
(45) Date of Patent: Nov. 3, 2015

(54) LEAKAGE VARIATION AWARE POWER MANAGEMENT FOR MULTICORE PROCESSORS

(75) Inventor: Hwisung Jung, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 140 days.

(21) Appl. No.: 13/471,226

(22) Filed: May 14, 2012

(65) Prior Publication Data

US 2013/0305068 A1  Nov. 14, 2013

(51) Int. Cl.
*G06F 1/32* (2006.01)
(52) U.S. Cl.
CPC ............ *G06F 1/3206* (2013.01); *G06F 1/3234* (2013.01); *G06F 1/3246* (2013.01); *G06F 1/3275* (2013.01); *Y02B 60/1228* (2013.01)
(58) Field of Classification Search
CPC ....... G06F 1/3203; G06F 1/4401; G06F 1/26; G06F 1/10; G06F 1/12; G06F 1/08; G06F 1/14
USPC .................................. 713/100, 300, 323, 322
See application file for complete search history.

(56) References Cited

U.S. PATENT DOCUMENTS

| | | | | |
|---|---|---|---|---|
| 7,380,147 B1 * | 5/2008 | Sun | ................................ | 713/323 |
| 2008/0307240 A1 * | 12/2008 | Dahan et al. | .................. | 713/320 |
| 2009/0031156 A1 | 1/2009 | Barth | | |
| 2010/0077243 A1 * | 3/2010 | Wang et al. | .................... | 713/323 |
| 2010/0153761 A1 * | 6/2010 | Nishioka | ........................ | 713/323 |
| 2011/0265090 A1 * | 10/2011 | Moyer et al. | .................. | 718/103 |
| 2012/0053897 A1 * | 3/2012 | Naffziger | ....................... | 702/182 |
| 2012/0166731 A1 * | 6/2012 | Maciocco et al. | ............. | 711/130 |
| 2012/0173907 A1 * | 7/2012 | Moses et al. | .................. | 713/321 |
| 2013/0047012 A1 * | 2/2013 | Jung | .............................. | 713/320 |
| 2013/0073884 A1 * | 3/2013 | Ulmer et al. | .................. | 713/320 |
| 2013/0138985 A1 * | 5/2013 | Wang et al. | ................... | 713/320 |

FOREIGN PATENT DOCUMENTS

WO    WO 2007090431 A1 *  8/2007

* cited by examiner

*Primary Examiner* — Vincent Tran
(74) *Attorney, Agent, or Firm* — Brinks Gilson & Lione (57) ABSTRACT

A system and method are provided to improve power efficiency of processor cores, such as processor cores in a multicore processor. A break-even time of a processor core may be determined that affects which power saving mode a processor core should enter when an expected idle of the processor core is identified. The break-even time of the processor core may be determined during run-time to help determine an applicable power saving mode that improves power efficiency of the processor core.

20 Claims, 8 Drawing Sheets

LEAKAGE VARIATION AWARE POWER MANAGEMENT FOR MULTICORE PROCESSORS

1. TECHNICAL FIELD

This disclosure relates to multicore processors. More particularly, this disclosure relates to managing power consumption of processor cores of a multicore processor.

2. BACKGROUND

Continual development and rapid improvement in modern technology has resulted in the widespread availability and use of electronic devices. Electronic devices are used in nearly every facet of life today. Electronic device and component manufacturers are continually developing additional features and functionality that consume power at increasing rates. As electronic devices become increasingly portable and functionally powerful, manufacturers and consumers have an increasing interest in improving the power efficiency of electronic devices.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Power loss in an integrated circuit ("IC") such as a processor core may occur for multiple reasons. Generally, power loss in an IC may be characterized as either dynamic dissipation that may occur because of switching variation or as static dissipation that may occur as a result of leakage current that is present even in the absence of switching variation. Such static power dissipation as a result of leakage current may also be referred to as leakage power, and may occur as long as the processor core is powered on. Processor cores may enter into various power management modes in order to control and minimize power loss.

Figure 1:
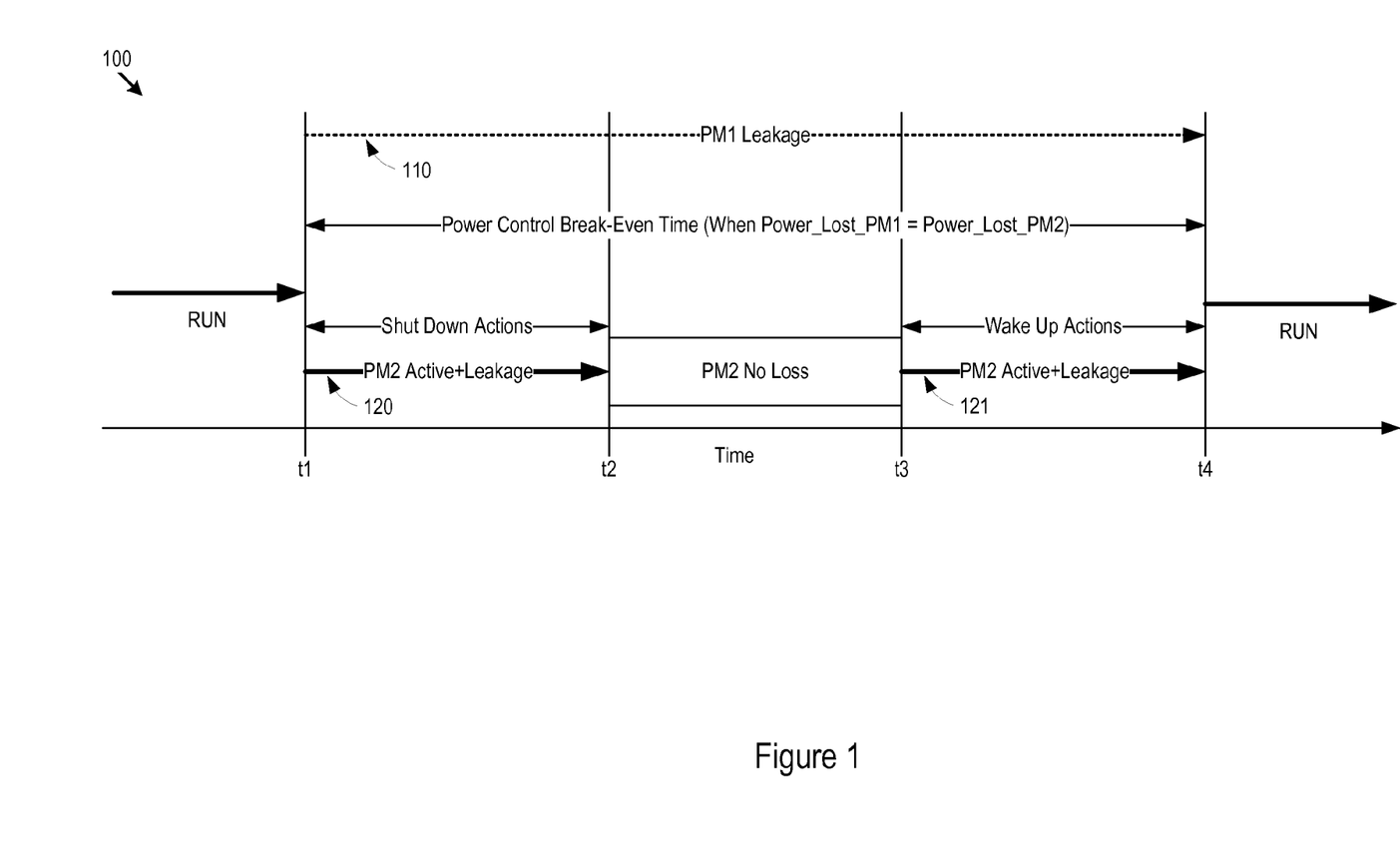
FIG. 1 shows a power loss timing example of a processor.

The discussion below makes reference to power control break-even time, which may be better understood through FIG. 1. FIG. 1 shows a power loss timing example 100 of a processor core. The power loss timing example 100 depicts the processor operating in varying modes at different points in time. Prior to time t1 and subsequent to time t4 represent times when processor core may operate in a normal execution mode (e.g., a mode in which no particular power management mode is applicable, applied, or enforced on the processor core).

Between time t1 and t4, the power loss timing example 100 shows power loss of the processor core according to two power management modes PM1 and PM2. There may be additional and different power management modes defined in the system that includes the processor cores. The power management modes described below are examples only.

A first power management mode (PM1) may be implemented by stopping switching variation of the processor core. For example, gating the clock of the processor core may operate to halt variation in the processor core, thereby limiting dynamic dissipation of power in the processor core. However, stopping switching variation of the processor core through the first power management mode may still result in power loss. As the processor core is still powered on (e.g., because one or more operational voltage(s) are still applied to the processor core), the processor core may continue to experience power loss in the form of leakage power. In the example of FIG. 1, the processor core enters into the first power management mode PM1 from time t1 to t4. The power lost by the processor core during this time can be represented by the PM1 lost leakage power 110. In one implementation, the lost leakage power may be determined as the leakage power rate of the processor core multiplied by the time the processor core is in the first power management mode PM1.

As is also illustrated in FIG. 1, a second power management mode PM2 may be implemented by powering off the processor core. Powering off the processor may be accomplished by, for example, removing or disconnecting one or more operational voltage(s) normally applied to the processor core, by substantially reducing one or more operational voltage(s), or in other ways. During the time the processor core is powered off, the processor core typically experiences little, if any, power loss, and in particular, the leakage power loss is significantly reduced if not completely eliminated. However, powering off a processor core may result in losing state information associated with the processor core, such as information stored in volatile memory incorporated or associated with the processor core, such as an L1 cache or an L2 cache. Thus, when entering into the second power management mode PM2, the processor core may execute shut down actions, such as preserving the memory state of the processor core. For example, the processor core may preserve memory state by storing the contents of the L1 cache or the L2 cache into another memory, such as a Random-Access Memory ("RAM") or an external memory. Additional shut down actions may be implemented beyond memory preservation actions. Similarly, when the processor core begins to exit the second power management mode PM2, the processor core may execute wake up actions, such as restoring the memory state of the processor core or other wake up actions that may correlate with shut down actions.

These additional actions taken to shut down and wake up by the processor core result in power loss based on switching variation to execute the additional shut down and wake up actions as well as any leakage power that occurs in the time it takes the processor core to execute the additional memory-related actions. Thus, as seen in FIG. 1, the processor core may begin the power management mode PM2 at time t1, and exit the power management mode PM2 at time t4. Although the second power management mode PM2 extends from time t1 to t4, power is still spent when the processor executes shut down actions from time t1 to time t2 and wake up actions from time t3 to t4. The power lost by the processor core during this time can be represented by the sum of the PM2 lost active and leakage power 120, which represents the amount of power dissipated by executing shut down actions to preserve the memory state of the processor core, depicted between time t1 and t2 and the PM2 lost active and leakage power 121, which represents the amount of power dissipated by executing wake up actions to restore the memory state of the processor core, depicted between t3 and t4.

In some implementations, a power control break-even time may be determined as a time duration at which more power can be saved by using a particular power mode over another different power mode. With respect to PM1 and PM2, for example, the power control break-even time may be determined as the amount of time needed for the PM1 lost leakage power 110 to equal to the sum of the PM2 shut down lost active and leakage power 120 and the PM2 start up lost active and leakage power 121. Phrased alternatively, in some implementations, the power control break-even may be a time duration that makes the amount of power lost by the processor core under the first power management mode PM1 the same as the amount of power lost by the processor core under the second power management mode PM2.

Figure 8:
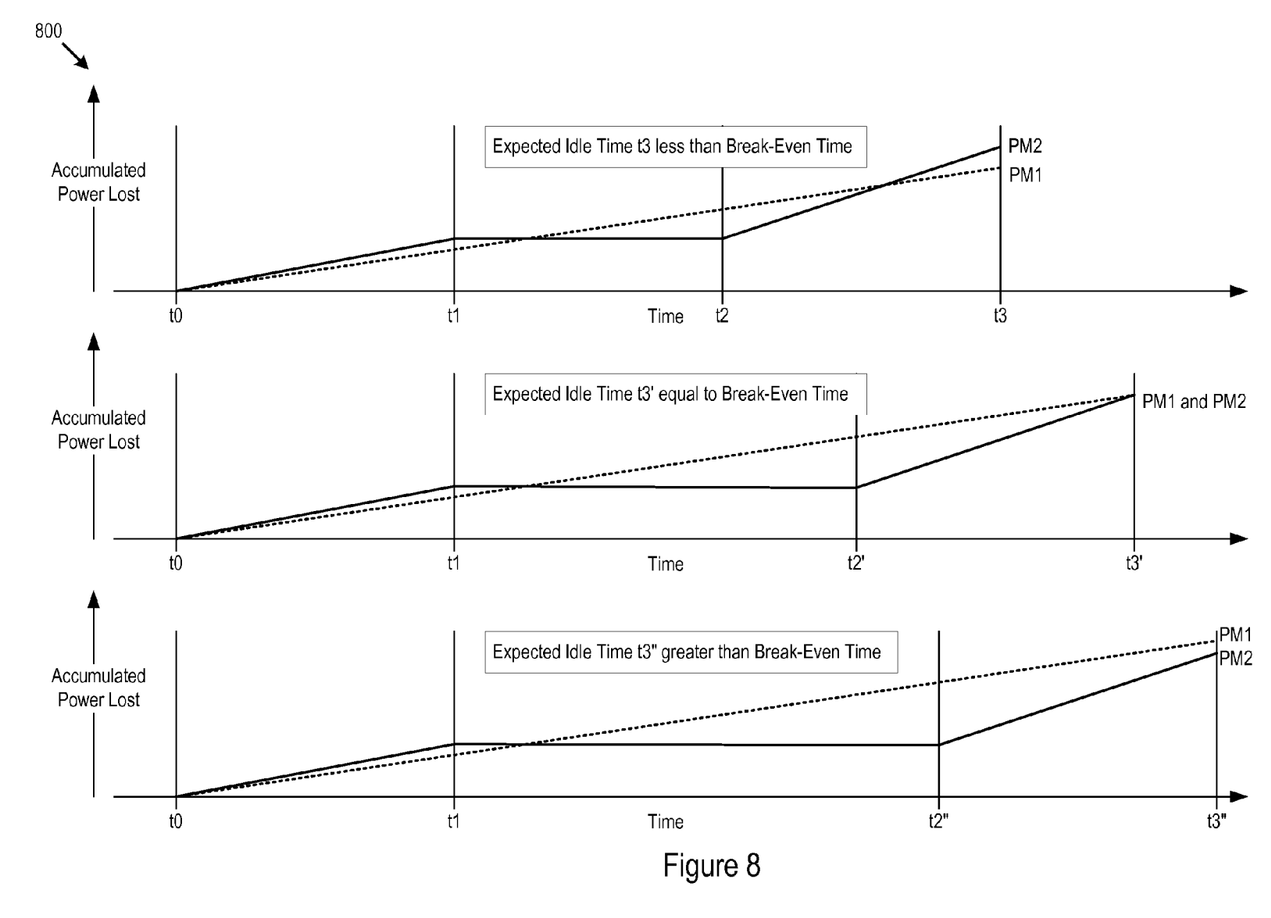
FIG. 8 shows various exemplary power loss timing diagrams.

As described above, it becomes apparent that the longer the amount of time a processor core remains in the first power management mode PM1, the more the accumulated power loss increases due to the persistent nature of leakage power. In contrast, regardless of the amount of time a processor core remains in the second power management mode PM2, the power lost by the processor remains constant or approximately constant. Thus, if the processor core is to enter one of the power management modes for an amount of time less than the power control break-even time of the processor core, then entering the first power management mode PM1 may result is less power loss than entering the second power management mode PM2. On the other hand, if the processor core is to enter one of the power management modes for an amount of time greater than the power control break-even time, entering the second power management mode PM2 may result in less power loss than entering the first power management mode PM1. Power accumulation comparisons are illustrated in FIG. 8 and described below.

Various factors may affect the power control break-even time of a processor core. First, the shut down and wake up actions executed in connection with entering the second power management mode PM2 may affect the power control break-even time of the processor core. Additional shut down and wake up actions, such as saving processor state in multiple locations (e.g., DDR RAM or an external memory), may affect the power control break-even time. Further, additional circuitry that may be powered off when entering the second power management mode PM2 may also affect the break-even time. For example, the second power management mode PM2 may be implemented by powering off the processor core and memory associated with the processor core, such as an L1 cache or an L2 cache. In this case, additional shut down actions may be executed to preserve the state of the processor core, such as saving the contents of the L1 cache or the L2 cache. Corresponding additional wake up actions may be included in the second power management mode PM2 as well. As the L1 cache or the L2 cache may be powered down when entering power management mode PM2, the leakage power of the L1 cache or the L2 cache may also be accounted for when determining the power loss of power management mode PM1.

Another factor that may affect the power control break-even time of a processor core is the performance level the processor core operates at. The processor core may operate at varying performance levels, which may be discrete performance levels. For example, a processor core may operate at an economy performance level with a first clock frequency, a normal performance level with a second frequency faster than the first clock frequency, and a turbo performance level with a third clock frequency faster than the first and second clock frequencies. For each performance level, the processor core may execute the shut down and wake up actions of the second power management level PM2 at different speeds but also with different power consumption over a given period. For example, if the processor core enters the second power management mode PM2 while operating at an economy performance level, the processor may take a longer time to execute the shutdown actions, resulting in higher leakage power lost as compared to the shorter time to execute the shutdown actions in the turbo performance level. However, the dynamic power loss from executing the shutdown actions in the turbo performance level may be higher due to the higher power cost to execute instructions at the higher clock frequency. Thus, performance level of a processor core may affect the processor core's power control break-even time.

As another example, the power control break-even time may be affected by leakage power characteristics of the processor core, which may vary from core to core of the same processor core type. The fabrication parameters used in manufacturing the processor core may affect the power control break-even time, as such parameters may affect the switching speed of the processor core. Process-Voltage-Temperature (PVT) variation effects, which may vary from processor core to processor core, may also affect the calculation of a power control break-even time. Thus, the power control break-even time of a processor core manufactured according to typical-typical ("TT") fabrication parameters may be different from the power control break-even time of the type of processor core manufactured according to fast-fast ("FF") fabrication parameters.

Aging effects that change properties of the processor core over time may also affect the leakage power of a processor core, thereby affecting the power control break-even time of the processor core. Thus, the power control break-even time of the same processor core may be different at differing points in time. Each of the above-described factors may affect the calculation and subsequent use of the power control break-even time of a processor.

Figure 2:
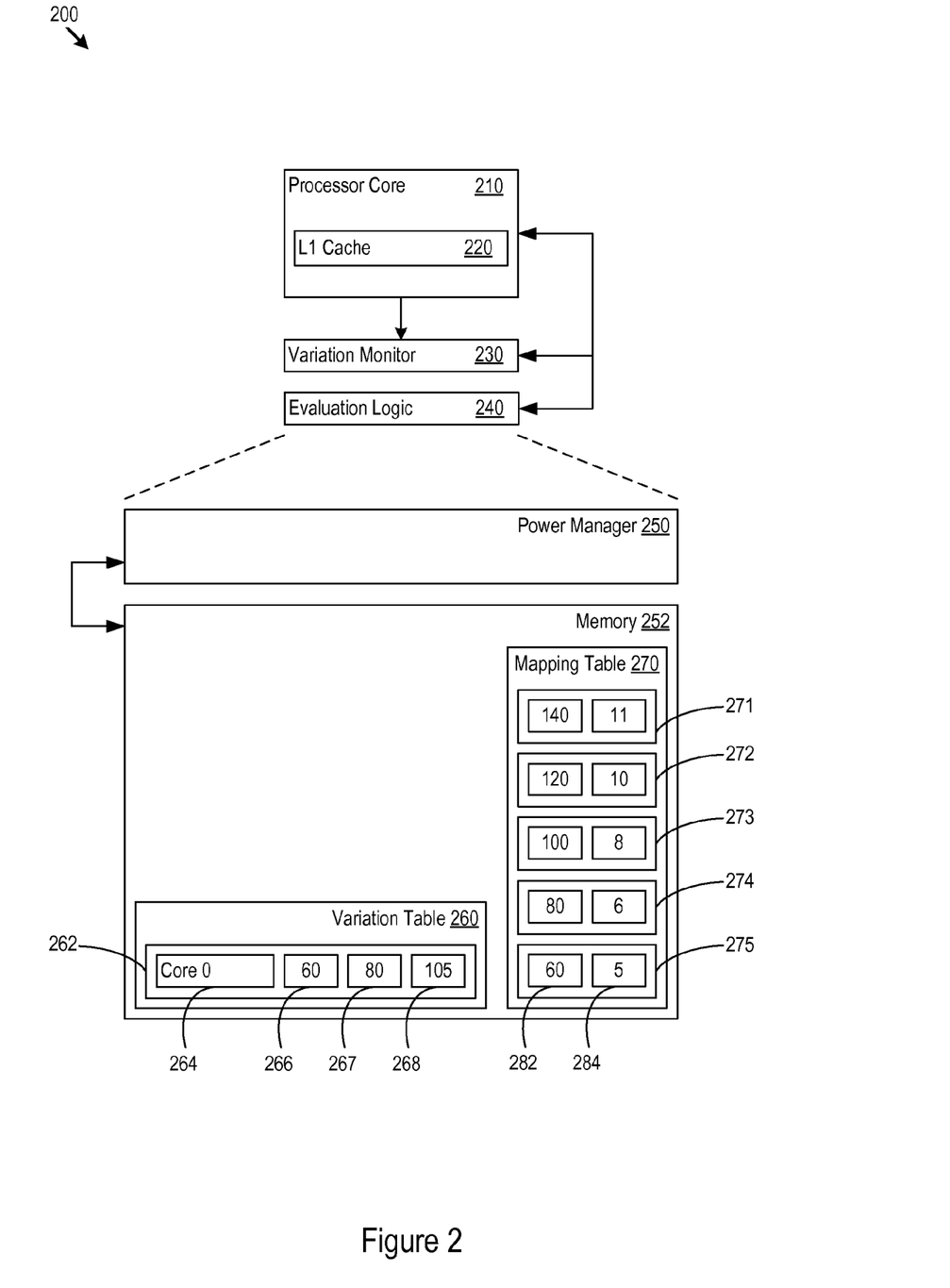
FIG. 2 shows an exemplary system for dynamically managing power control over a processor core.

FIG. 2 is an example of a system 200 for dynamically managing power control over a processor core. To that end, the system 200 may determine power control break-even times of the processor core as part of its operation. In this example, the system 200 includes a processor core 210 that includes an L1 cache 220. The system 200 also includes a variation monitor 230 and evaluation logic 240. The variation monitor 230 is communicatively coupled to the processor core 210, and the evaluation logic 240 is communicatively coupled to the variation monitor 230 and the processor core 210.

In operation, the evaluation logic 240 may instruct the variation monitor 230 to obtain an evaluation of or capture the leakage power behavior of the processor core 210, for example by measuring a variation indicator of the processor core 210. The variation monitor 230 may measure the variation indicator of the processor core 210 during run-time, for example when the processor core 210 initially boots up. Also, the variation monitor 230 or the evaluation logic 240 may instruct the processor core 210 to perform a predetermined action so that the variation monitor 230 can measure a variation indicator from the processor core 210. As one example, the evaluation logic 240 or the variation monitor 230 may instruct the processor core 210 to execute a save and restore operation using the L1 cache 220, during which the variation monitor 230 may measure a variation indicator of the processor core 210.

The variation indicator may indicate leakage power behavior of the processor core 210 during run time. In other words, the variation indicator captured by the variation monitor 230 may be reflective or show properties of the processor core 210 that may affect determination of a power control break-even time of the processor, including, for example, PVT variations, fabrication parameters, properties during run-time (e.g., core temperature), and aging effects of the processor core 210. The variation monitor 230 may include logic or hardware that is physically connected to or located within each processor core (e.g., the processor 210) the variation monitor 230 is connected to in order to measure the variation indicator. As one example, the variation monitor 230 may be silicon performance monitor ("SPM") hardware and logic. A SPM may measure the total toggle counts of ring-oscillator which are generally affected by PVT variations, fabrication parameters, aging effects, and other processor properties that may affect the determination of a the power control break-even time for the processor 210.

As described above, the power control break-even time of the processor core 210 may vary depending on the performance level of the processor core 210. Accordingly, the evaluation logic 240 may instruct the variation monitor 230 to measure a variation indicator of the processor core 210 for each performance level the processor core 210 may operate at. To illustrate, the evaluation logic 240 may instruct the processor core 210 to perform a predetermined set of actions at varying performance levels, for example executing a save and restore operation using the L1 cache three times—first at an economy performance level, second at a normal performance level, and third at a turbo performance level. The variation monitor 230 may measure three variation indicators from the processor core 210, one for each performance level. If the processor core 210 can operate in N number of performance levels, the variation monitor 230 may measure up to N number of variation indicators.

Upon measuring a variation indicator of the processor core, The evaluation logic 240 may determine a power control break-even time based on a measured variation indicator. For example, the evaluation logic 240 may map the measured variation indicator to a power control break-even time, as described in greater detail below. The evaluation logic 240 may determine a respective power control break-even time for each performance level the processor core 210 can operate in.

Next, the evaluation logic 240 may obtain an expected idle time of the processor core, for example from logic external to the system 200. The evaluation logic 240 may then determine an applicable power saving mode for the processor core 210 based on the current performance level of the processor core 210, the expected idle time, and the applicable power control break-even time. For example, if the expected idle time is less than the power control break-even time, the evaluation logic 240 may instruct the processor core 210 to enter into a first power management mode, such as power management mode PM1 described above. If the expected idle time is greater than the power control break-even time, the evaluation logic 240 may instruct the processor core 210 to enter into a second power management mode, such as power management mode PM2 described above.

As shown in FIG. 2, the evaluation logic 240 may be implemented as a power manager 250 and a memory 252. The power manager 250 may be implemented as hardware, software, or both. For example, the power manager 250 may be implemented as a microcontroller, including a microcontroller processor, microcontroller memory and microcontroller instructions or as a processor and memory storing processor executable instructions. The power manager 250 may be communicatively coupled to the memory 252, and the memory 252 may include a variation table 260 and a mapping table 270. The evaluation logic 240 may also store a current power control break-even time of the processor core 210 in a register or in a location in the memory 252. In operation, the power manager 250 may apply a power management mode to the processor core 210 based on a power control break-even time, as discussed above. In doing so, the power manager 250 may reference or update the variation table 260. The power manager 250 may also reference the mapping table 270.

The variation table 260 may store variation indicator information of a processor core, such as variation indicators of the processor core 210 measured by the variation monitor 230. The variation table 260 in FIG. 2 includes a variation table entry 262. The variation table entry 262 includes a processor core ID field 264, a first performance level variation indicator field 266, a second performance level variation indicator field 267, and a third performance level variation indicator field 268. The processor core ID field 264 may identify the processor core that the variation table entry 262 stores variation indicator information for. In FIG. 2, the variation table entry 262 stores variation indicator information for Core 0. The first performance level variation indicator field 266 may store the variation indicator measured by the variation monitor 230 when the processor core 210 was operating in an economy performance level, such as the variation indicator 60, as show in FIG. 2. Similarly, the second performance level variation indicator field 267 may store variation indicator information measured when the processor core 210 was operating in normal performance level and the third performance level variation indicator field 268 may store variation indicator information measured when the processor core 210 was operating in turbo performance level. Thus, the variation table entry 262 indicates that the variation monitor 230 measured a variation indicator of 60 when the processor core 210 was operating in economy, 80 when operating in normal, and 105 when operating in turbo.

The power manager 250 may update entries in the variation table 260 whenever the variation monitor 230 measures a variation indicator of the processor core 210. As discussed above, the variation monitor 230 may measure variation indicators when the processor core 210 initially boots up. Alternatively, the power manager 250 may instruct the variation monitor 230 to measure variation indicators of the processor core 210 at fixed intervals, such as once every two milliseconds, or when instructed by other systems or logic in communication with the power manager 250. The power manager 250 may update (or create) the applicable entry in the variation table 260 whenever such variation indicator measurements are conducted.

The power manager 250 may reference the variation table 260 and the mapping table 270 in order to determine a power control break-even time of the processor core 210. As depicted in FIG. 2, the mapping table 270 includes the mapping table entries 271-275. The mapping table entry 275 includes a variation indicator field 282 and a power control break-even time field 284. Each of the mapping table entries 271-275 may associate a variation indicator with a power control break-even time for a processor core, such as the processor core 210. Thus, according to the mapping table entry 275 in FIG. 2, for the processor core 210, a variation indicator of 60 corresponds to a power control break-even time of 5 ms. A variation indicator of 80 corresponds to a power control-even time of 6 ms, etc.

Entries in the mapping table 270 may be generated through extensive simulations. That is, behavior of the processor core 210 may be simulated to determine how variation indicators of the processor core 210 correlate to a power control break-even time. The extensive simulations may involve measuring power loss in the processor core in the first power management mode PM1 and the second power management mode PM2 according to any number of processor configurations or variation parameters. The simulations may also incorporate other factors affecting the power control break-even time calculation, such as any of the factors discussed above that affect the power control break-even time of a processor. The simulations may also account for the particular shut down actions and what wake up actions are executed by the processor core when entering and existing a second power management mode PM2. As another example, simulations may involve changing the voltage and temperature values for processors cores fabricated at each processor corner and determining the power control break-even time based on each scenario.

The power manager 250 may determine a power control break-even time of the processor core 210 by referencing the variation table 260 and the mapping table 270. For example, when the processor core 210 is operating in an economy performance level, the power manager 250 may reference the variation table 260 to determine that a variation indicator of 60 was measured for economy level operation. The power manager 250 may then reference the mapping table 270, specifically mapping table entry 282, to determine that the current power control break-even time of the processor core 210 operating in an economy performance level is 5 ms.

If the exact variation indicator value in a variation table entry is not stored as part of an entry in the mapping table 270, then the power control break-even time may be extracted from other mapping table entries. For example, the power manager 250 may determine that the measured variation indicator for a turbo performance level of the processor core 210 is 105. The mapping table 270 does not include an entry that includes a variation indicator of 105. Instead, the mapping table entry 273 maps a variation indicator of 100 to a power control break-even time of 8 ms and the mapping table entry 272 maps a variation indicator of 120 to a power control break-even time of 10 ms. Thus, the power manager 250 may determine that the current power control break-even time of the processor core 210 operating at a turbo performance level is somewhere between 8 ms and 10 ms. As one example, the power manager 250 may determine a power control break-even time for the processor core 210 with the variation indicator of 105 by linearly interpolating between the two mapping table entries, resulting in a power control break-even time of 8.5 ms. Alternatively, the power manager 250 may apply a "worst-case scenario" determination policy, determining that the power control break-even time is 10 ms.

Once the power control break-even time of the processor core is determined, the power manager 250 may obtain an expected idle time, and apply a power management mode to the processor core 210 based on the current performance level, the expected idle time, and the power control break-even time.

Figure 3:
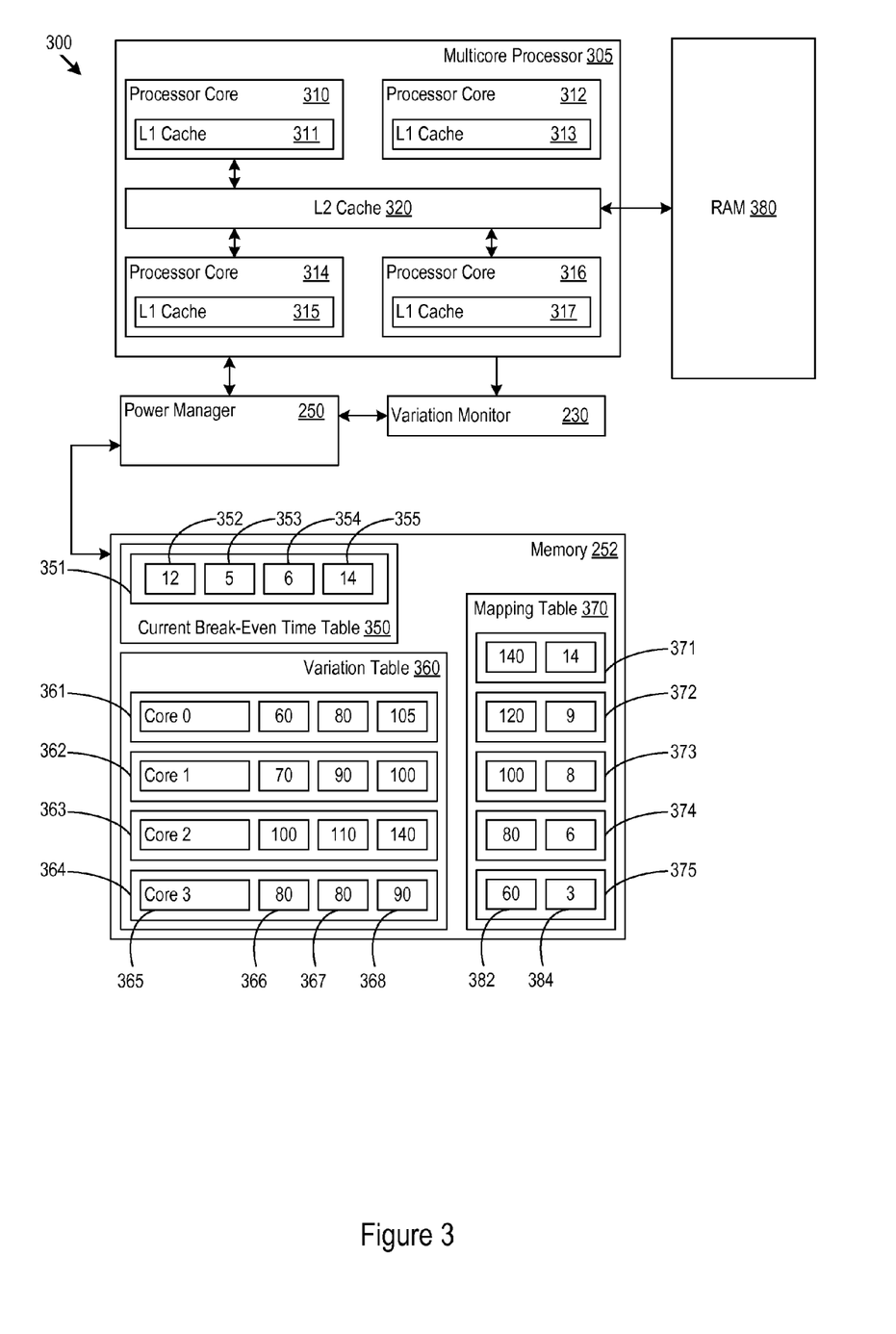
FIG. 3 shows an exemplary system for dynamically managing power control over processor cores of a multicore processor.

FIG. 3 shows an exemplary system 300 for dynamically managing power control over processor cores of a multicore processor. To that end, the system 300 may determine power control break-even times of the processor cores of the multicore processor as part of its operation. The system 300 includes a multicore processor 305. The multicore processor 305 includes the processor cores 310, 312, 314, and 318, which each include a corresponding L1 cache (L1 caches 311, 313, 315, and 317 respectively). The multicore processor 305 also includes an L2 cache 320, communicatively coupled to each of the processor cores 310, 312, 314, and 316. The system 300 also includes a power manager 250 and a memory 252. The memory 252 includes a current power control break-even time table 350, a variation table 360, and a mapping table 370.

In operation, the processor cores 310, 312, 314, and 316 may store and read data from the L2 cache 320. The power manager 250 may measure variation indicators for varying processor core performance levels, update or reference the variation table 360, reference the mapping table 370, and determine a power control break even time for each of the processor cores 310, 312, 314, and 316 in a similar manner as described in FIG. 2. The power manager 250 may also apply a power management mode to the processor core 310, the processor core 312, the processor core 314, or the processor core 316 based on the current power control break-even time of the processor core, the performance level the processor core is operating at, and an expected idle time of the processor core.

The current power control break-even time table 350 may include a current power control break-even time entry 351 that may store the current power control break even time of each processor core of the multicore processor 305. The current power control break-even time entry 351 may include a first field 352 that stores the current power control break-even time of the processor core 310, a second field 353 that stores the current power control break-even time of the processor core 312, a third field 354 that stores the current power control break-even time of the processor core 314, and a fourth field 355 that stores the current power control break-even time of the processor core 316. The power manager 250 may update the current power control break-even time of a processor core when the processor core changes performance level. For example, if the processor core 310 changes performance level from economy to turbo, the power manager 250 may determine the power control break-even time of the processor core 310 when operating in a turbo performance level. Then, the power manager 250 may update the first field 352 of the current power control break-even time entry 351 to reflect the change in performance level of the processor core 310.

In one implementation, the power manager 250 may use the power control break-even time of a processor core to determine an applicable power management mode when no other processor cores of the multicore processor 305 are active. Additional processor power management logic (not pictured) may be used to control power management of the processor cores 310, 312, 314, and 316 when multiple cores are active. For example, when performance needs of the multicore processor 305 are reduced, the additional processor power management logic may power off a processor core based on performance requirements and without referencing the power control break-even time of the processor core. Thus, in this implementation, the power manager 250 may update the current power control break-even time of a processor core when no other processor cores are active, but not when other processor cores are active. Also, to update the variation table 360, the power manager 250 may instruct the variation monitor 230 to measure a variation indicator for each performance level of the processor core 310 when no other processors are active. This can be done in order to model leakage power behavior during conditions when the power control break-even time would be applied (e.g., when no other processors are active). Similar variation indicator measurements may be measured for the processor cores 312, 314, and 316 as well. The variation indicator information measured from the processor cores 310, 312, 314, and 316 may be stored in the variation table 360.

As discussed above, a processor core entering a second power management mode PM2 may perform shut down actions whereupon the processor core is powered off. In one implementation for the system 300 including the multicore processor 305, the second power management mode PM2 may be adjusted to also include powering off the L2 cache. In one implementation, the adjusted second power management mode PM2 may be applicable when a processor core is entering the adjusted second power management mode PM2 when no other processor cores are active. To illustrate, the processor core 310 may be the only active processor core in the multicore processor 305. As a result, the processor 310 may be the only processor core in the multicore processor 305 using the L2 cache 320.

Thus, if the power manager 250 identifies expected idle time for the processor core 310, the L2 cache 320 may also be powered off without affecting the performance or functionality of the other processor cores 312, 314, and 316. As a result, the second power management mode PM2 may be adjusted such that the shutdown actions also include preserving the contents of the L2 cache 320, for example by copying the contents of the L2 cache to a Random Access Memory 380. The wake up actions of the second power management mode PM2 may also be adjusted to include restoring the contents of the L2 cache 320 upon wakeup. Also, the power loss calculation for the first power management mode PM1 may be adjusted to include the leakage power rate of both the processor core 310 and the L2 cache 320. These changes in the power management modes PM1 and PM2 may affect the calculation of the power control break-even time of the processor core 310. These factors may be incorporated into the simulations used to generate the mapping table 370 and reflected in the entries 371-375 of the mapping table 370.

The power manager 250 may identify expected idle time for a processor core. The power manager 250 may then apply a power management mode to the processor core based on the expected idle time and the current power control break-even time of the processor core.

Figure 4:
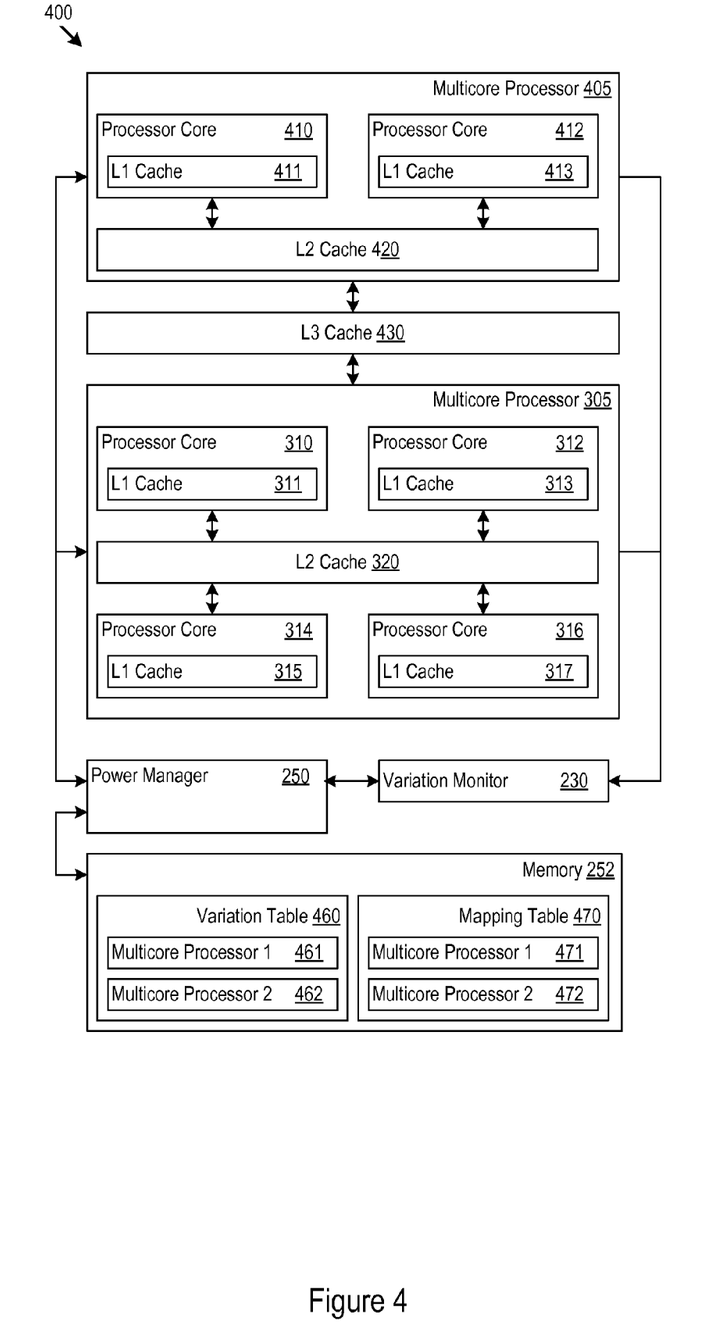
FIG. 4 shows an exemplary system for dynamically managing power control over processor cores of multicore processors.

FIG. 4 shows an exemplary system 400 for dynamically managing power control over processor cores of multicore processors. To that end, the system 400 may determine power control break-even times of the processor cores of the multicore processors as part of its operation. The system 400 depicted in FIG. 4 includes a multicore processor 405 that includes two processor cores 410 and 412 and a multicore processor 305 that includes four processor cores 310, 312, 314, and 316. The multicore processors 405 and 305 may be communicatively coupled to a L3 Cache 430.

The system 400 also includes a power manager 250 that may apply power management modes to the processor cores 410, 412, 310, 312, 314, and 316 of the multicore processors 405 and 305. To that end, the power manager 250 may be communicatively coupled to a memory 252 that includes a variation table 460 and a mapping table 470. The memory 252 may also include a current power control break-even time table (not pictured) that stores the current power control break-even time for each of the processor cores in the system 400.

In operation, the power manager 250 may apply power management modes to processor cores of the multicore processor 305 or the multicore processor 305 in a similar way as described in FIG. 3 above. In one implementation, the power manager 250 may manage power management modes for processor cores of the multicore processor 405 separately from processor cores of the multicore processor 305. For example, the power manager 250 may manage power management modes for the processor cores 310, 312, 314, and 316 of the multicore processor 305 in a similar way as detailed in FIG. 3, which did not depict an additional L3 cache 430 or the multicore processor 405. Alternatively, the power manager 250 may manage power management modes by considering the cores of the multicore processors 405 and 305. For example, the power manager 250 may use the power control break-even time of a processor core to determine an applicable power management mode when no other processor cores of either the multicore processor 305 or the multicore processor 405 are active. In this situation, a second power management mode PM2 may be further adjusted to account for powering off the L3 cache 430 in a similar way as described in adjusting the second power management mode PM2 to account for powering off an L2 cache as described above.

To account for managing power management modes of the multicore processor 305 and the multicore processor 405, the variation table 460 may include separate portions for each multicore processor. The variation table 460 depicted in FIG. 4 includes a multicore processor 1 portion 461 that may store variation indicator information for the multicore processor 305 and a multicore processor 2 portion 462 that may store variation indicator information for the multicore processor 405.

Similarly, the mapping table 470 may include separate portions for each multicore processor managed by the power manager 250. As an example, the mapping table 470 depicted in FIG. 4 includes a multicore processor 1 portion 471 that may store variation indicator to power control break-even time mappings for the multicore processor 305 and a multicore processor 2 portion 472 that may store variation indicator to power control break-even time mappings for the multicore processor 405.

Figure 5:
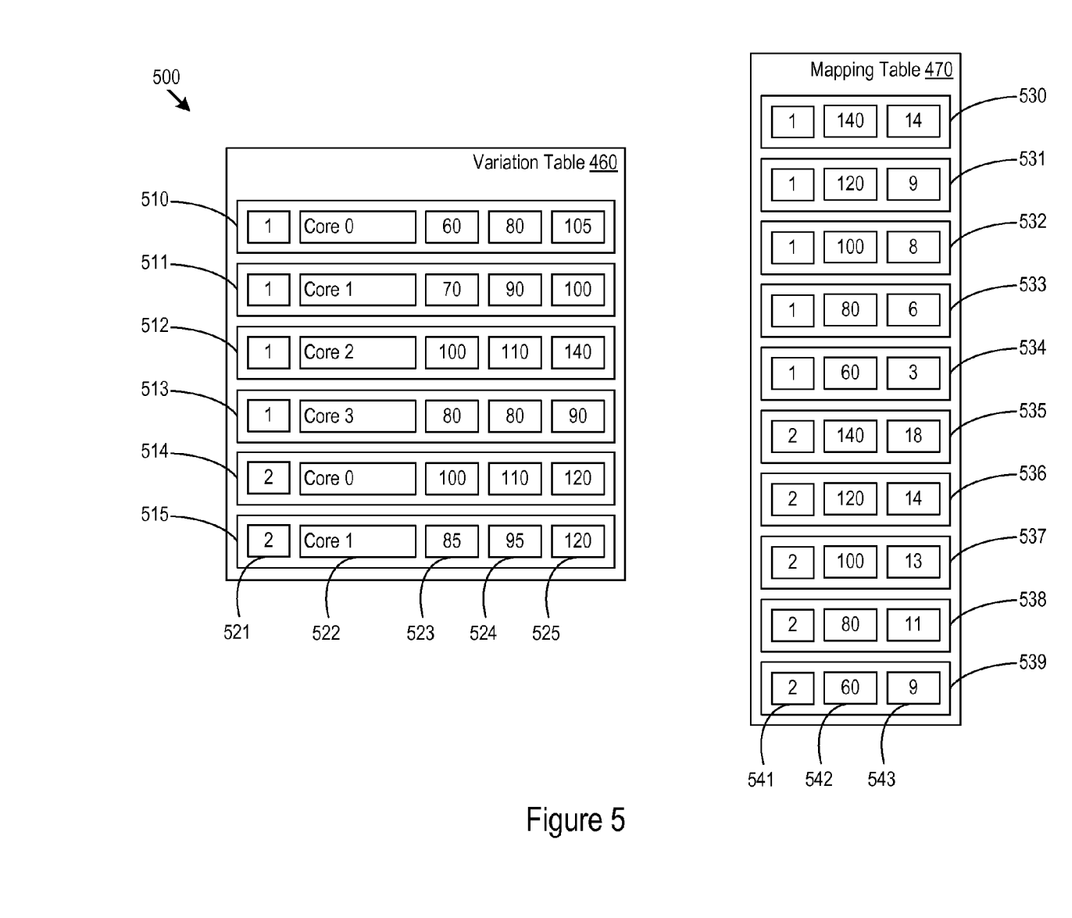
FIG. 5 shows exemplary tables that may be used to dynamically calculate the power control break-even time of processor cores of multicore processors.

FIG. 5 shows exemplary tables 500 that may be used to dynamically calculate the power control break-even time of processor cores of multicore processors. The exemplary tables 500 include a variation table 460 and a mapping table 470. The variation table 460 includes variation table entries 510-515. The mapping table 470 includes mapping table entries 530-539.

The variation table 460 may be arranged similarly to the variation table 260 described in FIG. 2 above. However, as the variation table 460 may store variation indicator information for multiple processors, such as the multicore processor 305 and the multicore processor 405, entries in the variation table 460 (e.g., variation table entries 510-515) may include an additional field identifying the processor the entry is associated with. To illustrate, the variation table entry 515 may include a processor ID field 521, processor core ID field 522, a first performance level variation indicator field 523, a second performance level variation indicator field 524, and a third performance level variation indicator field 525. The processor ID field 521 in variation entry table 515 may store a value of 2, indicating this entry is associated with processor 2, that is multicore processor 405. Thus, variation table entry 514 may store variation indicator information for the processor core 410 of the multicore processor 405 and variation table entry 515 may store variation indicator information for processor core 412 of the multicore processor 405. Variation entries 510-513 may respectively store variation indicator information for the processor cores 310, 312, 314, and 316 of the multicore processor 305 in a similar way.

The mapping table 470 may be arranged similarly to the mapping table 270 described in FIG. 2 above. Mapping table entries 530-539 may associate a variation indicator with a power control break-even time for processor cores of the multicore processor 305 or the multicore processor 405. Thus, entries in the mapping table 470 may include an additional field not included in the mapping table 270 to identify the processor the entry is associated with. To illustrate, the mapping table entry 539 includes a processor ID field 541, a variation indicator field 542, and a power control break-even time field 543. The processor ID field 541 may store a value of 2, indicating the mapping table entry 539 is associated with the multicore processor 405. Similar fields in mapping table entries 535-539 may also indicate these entries are associated with the multicore processor 405. In the same way, mapping table entries 530-534 may be associated with the multicore processor 305.

In operation, the power manager 250 may reference or update a corresponding entry of the variation table 460 depending on which processor, which processor core, and which performance level the updated or referenced variation indicator information relates to. Similarly, the power manger 250 may reference a corresponding entry or entries in the mapping table 470 depending on the processor and variation indicator.

Figure 6:
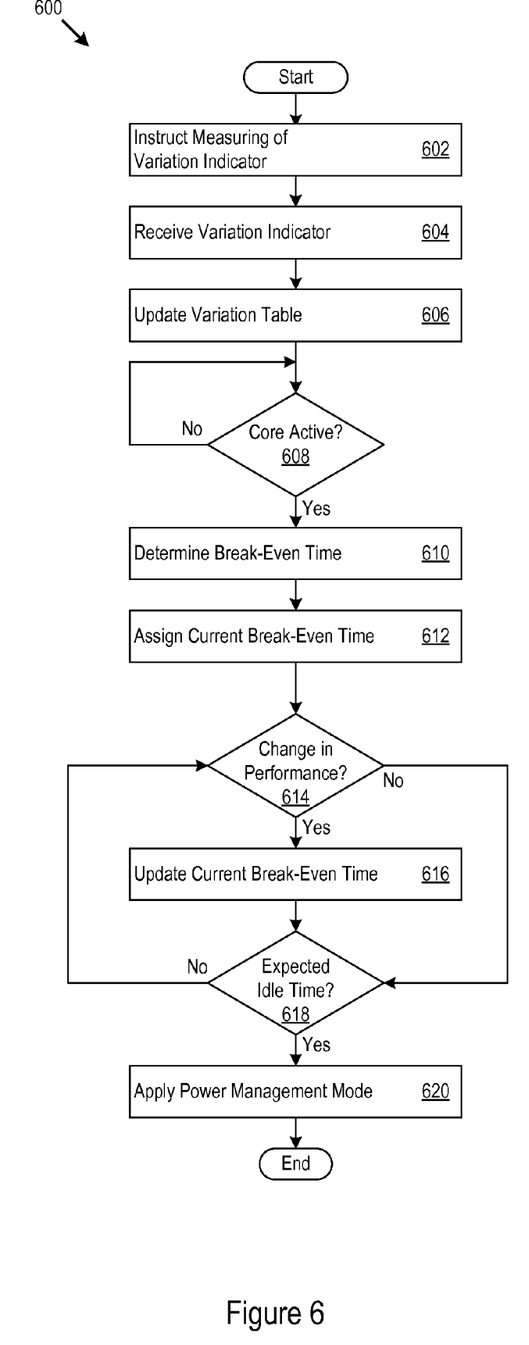
FIG. 6 shows power control logic that a system may implement as hardware, software, or both.

FIG. 6 shows power control logic 600 that the system 200 may implement as hardware, software, or both. For example, the power control logic 600 may be implemented in the power manager 250. The power manager 250 may instruct a variation monitor 230 to measure a variation indicator of a processor core (602). If the processor core can operate at multiple performance levels, the power manager 250 may instruct the variation monitor 230 to measure a variation indicator for each performance level. For example, when the processor core starts up, the power manager 250 may instruct the processor core to execute a set of actions at each performance level, whereupon the variation monitor 230 may measure a variation indicator. The power manager 250 may receive the measured variation indicator(s) from the variation monitor 230 (604). Next, the power manager 250 may update a variation table 260 to reflect the measured variation indicators (606).

After updating the variation table 260, the power manager 250 may determine when the processor core next becomes active (608). For example, after performing variation during for measuring variation indicators at boot time, the processor core may be inactive until a later time. When the processor core becomes active, the processor core may operate at a performance level. The power manager 250 may determine the power control break-even time of the processor core (610). For example, as described above, the power manager 250 may reference the variation table 260 and the mapping table 270 to determine a power control break-even time for the processor core operating at the performance level. The power manager 250 may then assign a current power control break-even time to the processor core (612).

The power manager 250 may determine if the processor core changes performance level (614). If so, the power manager 250 may update the current power control break-even time of the processor core (616). The power manager 250 may similarly determine the power control break-even time of the performance level the processor core changed to by referencing the variation table 260 and the mapping table 270.

If the power manager 250 does not determine the processor core changed performance, the power manager 250 may identify an expected idle time of the processor core (618). Expected idle time may be identified in different ways. For example, if the processor core is processing a music file, the power manager 250 or additional logic may identify expected idle time based on the sampling frequency the music file is encoded in. For example, if sampling the music file requires 2 ms of processing time by the processor core every 10 ms, then the power manager 250 may identify 8 ms of expected idle time after performing the 2 ms of music sampling processing. In one implementation, expected idle time is determined by additional logic external to the power manager 250, whereupon the expected idle time is then received by the power manager 250.

If the power manager 250 does not identify or receive an expected idle time, then the power manager 250 may continue to monitor whether the processor core changes performance level (614) or identifies or receives an expected idle time (618). If the power manager 250 identifies or receives an expected idle time, the power manager 250 may apply a power management mode to the processor core based on the current power control break-even time and the expected idle time (620).

Figure 7:
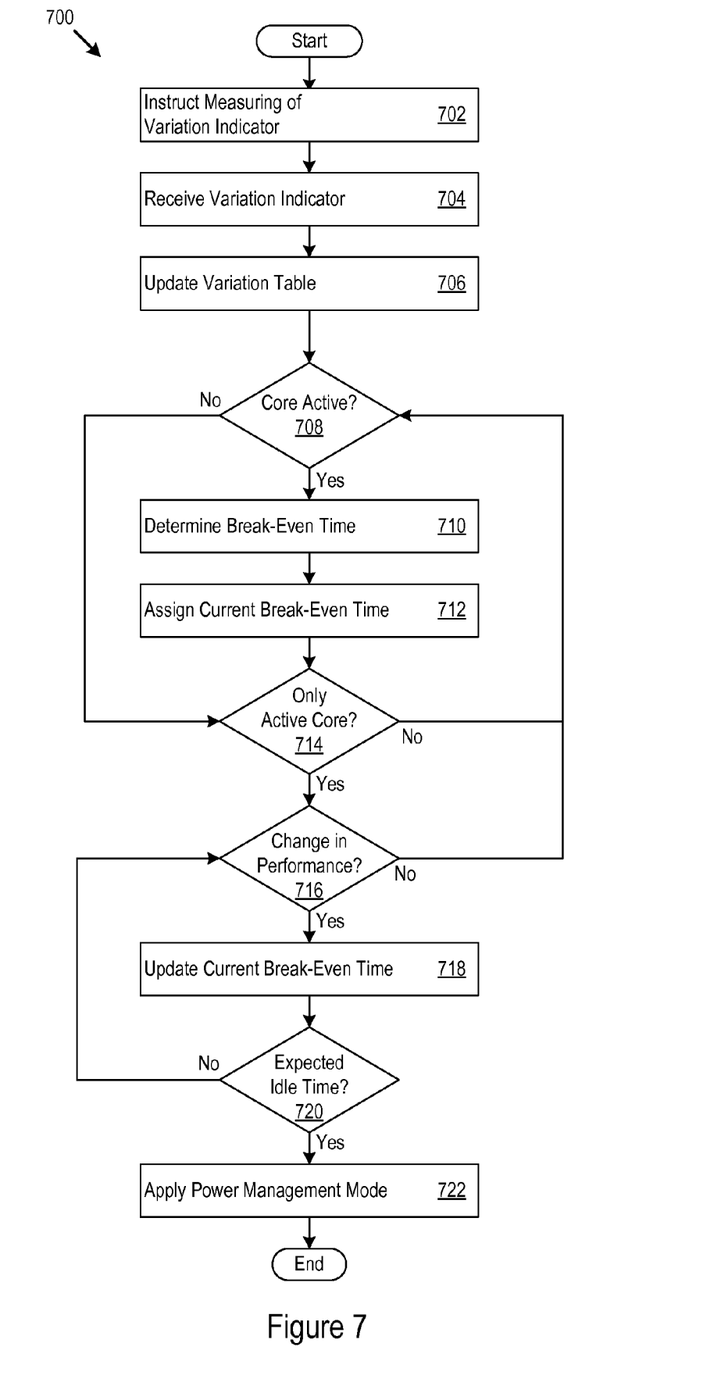
FIG. 7 shows power control logic that a system may implement as hardware, software, or both.

FIG. 7 shows power control logic 700 that the system 400 may implement as hardware, software, or both. For example, the power control logic 700 may be implemented in a power manager 250 that manages power management modes of processor cores in multicore processors. A power manager 250 may instruct a variation monitor 230 to measure variation indicators for each processor core of each multicore processor in a system (702). If any processor cores of any multicore processor can operate at multiple performance levels, the power manager 250 may instruct the variation monitor 230 to measure each of the variation indicators for each performance level of each applicable processor core of each multicore processor. This variation indicator measurement may occur when the multicore processors first become powered on during a boot up sequence. When each multicore processor core starts up, the power manager 250 may instruct the processor core to execute a set of actions at each performance level, whereupon the variation monitor 230 may measure a variation indicator.

Next, the power manager 250 may receive the measured variation indicator(s) from the variation monitor 230 (704). Next, the power manager 250 may update a variation table 260 to reflect the measured variation indicators for each processor core for each multicore processor (706).

After the initial update of the variation table 460 during startup, the power manager 250 may then monitor when any processor core of any multicore processor becomes active, which may include identifying the performance level the activated processor core begins operating at (708). The power manager 250 may determine the power control break-even time of the activated processor core (710). For example, as described above, the power manager 250 may reference the variation table 460 and the mapping table 470 to determine a power control break-even time for the processor core operating at the performance level. The power manager 250 may then assign a current power control break-even time to the processor core (712), which may also be stored in a current power control break-even time table, such as the one described in FIG. 3.

The power manager 250 may continue to monitor if any processor cores of any multicore processor become active and determine and assign a current power control break-even time to the processor core (708-712). The power manager 250 may also determine if, at any point, only one processor core of a multicore processor is active (714). Or alternatively, the power manager 250 may determine if, at any point, only one processor core of multiple multicore processors is active. If so, power manager 250 may then monitor if the processor core changes performance level (716). If a performance level change occurs, the power manager 250 may update the current power control break-even time of the processor core (718), for example by referencing the variation table 260 and the mapping table 270.

If only one processor core is active, the power manager 250 may also identify or receive an expected idle time of the processor core (720). If the power manager 250 does not identify or receive an expected idle time, then the power manager 250 may continue to monitor whether the processor core changes performance level (716) or identifies or receives an expected idle time (720) for as long as only one processor core remains active.

If an expected idle time is identified or received, the power manager 250 may apply a power management mode to the processor core based on the current power control break-even time and the expected idle time (722). If at some time another processor core becomes active (708), the power manager 250 may not apply the power manage mode to processor cores until the situation returns where only one processor core is active (714).

FIG. 8 shows various exemplary power loss timing diagrams 800. The power loss timing diagrams 800 illustrate a comparison of accumulated power loss between a first power management mode PM1 and a second power management mode PM2 when an expected idle time is less than the power control break-even time of a processor core, is equal to the power control break-even time of a processor core, and is greater than the power control break-even time of a processor core.

The timing diagram at the top of FIG. 8 illustrates a comparison of accumulated power loss between a first power management mode PM1 and a second power management mode PM2 when an expected idle time t3 is less than the power control break-even time of a processor core. The first power management mode PM1 shown in FIG. 8 may be configured in a similar way as the first power management mode PM1 as described in FIG. 1 above. That is, lost leakage power in the first power management mode PM1 may be determined as the leakage power rate of the processor core multiplied by the time the processor core is in the first power management mode PM1. In other words, when a processor core enters into the first power management mode PM1 at a time t0, the power is lost in the form of leakage power at a steady state, as illustrated by the straight dotted line corresponding to the accumulated power lost by the first power management mode PM1 over time.

The second power management mode PM2 shown in FIG. 8 may be configured in a similar way as the second power management mode PM2 as described in FIG. 1 above. The power lost by a processor core entering into the second power management mode PM2 can be understood as the sum of the amount of power dissipated by executing shut down actions (depicted between time t0 and t1) and the amount of power dissipated by executing wake up actions (depicted between t2 and t3). As seen in FIG. 8, when the processor core enters into the second power management mode PM2, the PM2 power loss represented by the solid line is only accumulated during execution of the shut down actions during time t0 to t1 and during execution of wake up actions during time t2 to t3. Between time t1 and t2, the processor core does not dissipate leakage power and no power is lost. As illustrated in the timing diagram at the top of FIG. 8, when the expected idle time is equal to the time t3, the power loss experienced by a processor entering into the second power management mode PM2 is greater than the power loss experienced by the processor entering into the first power management mode PM1. Thus, the processor core may enter into the first power management mode PM1 when an expected idle time is received that is less than the power control break-even time of the processor.

The timing diagram in the middle of FIG. 8 illustrates a comparison of accumulated power loss between a first power management mode PM1 and a second power management mode PM2 when an expected idle time t3' is equal to the power control break-even time of a processor. Similar to the timing diagram at the top of FIG. 8, the PM1 power loss illustrated by the dotted line increases at a steady state. Similarly, the PM2 power loss represented by the solid line is only accumulated during execution of the shut down actions during time t0 to t1 and during execution of wake up actions during time t2' to t3'. When the expected idle time is equal to the time t3', the power loss experienced by a processor entering into the second power management mode PM2 is equal to the power loss experienced by the processor entering into the first power management mode PM1. In this case, the processor may enter either the first power management mode PM1 or the second power management mode PM2.

The timing diagram at the bottom of FIG. 8 illustrates a comparison of accumulated power loss between a first power management mode PM1 and a second power management mode PM2 when an expected idle time t3" is greater than the power control break-even time of a processor. Similar to the timing diagrams at the top and the middle of FIG. 8, the PM1 power loss illustrated by the dotted line increases at a steady state. Similarly, the PM2 power loss represented by the solid line is only accumulated during execution of the shut down actions during time t0 to t1 and during execution of wake up actions during time t2" to t3". When the expected idle time is equal to the time t3", the power loss experienced by a processor entering into the second power management mode PM2 is less than the power loss experienced by the processor entering into the first power management mode PM1. Thus, the processor core may enter into the second power management mode PM2 when an expected idle time is received that is greater than the power control break-even time of the processor.

As seen in FIG. 8, the length of time that elapses when the second power management mode PM2 executes shut down actions between time t0 and t1 is consistent across all three timing diagrams. Similarly, the length of time that elapses when the second power management mode PM2 executes wake up actions between time t2 to t3, time t2' to t3', and time t2" to t3" respectively is also consistent across all three timing diagrams. The PM2 power loss accumulated during execution of the shut down actions and the wake up actions in all three timing diagrams is also consistent. In other words, the accumulated power loss of a processor core entering into the second power management mode PM2 is the same in all three timing diagrams. Thus, the power control break-even time represents the time when the PM1 power loss that steadily increases over time equals the PM2 power loss that is constant regardless of time.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   measuring, during run time, a first variation indicator of a processor core, wherein the first variation indicator is indicative of leakage power behavior of the processor core;
   storing the first variation indicator in a first data structure;
   comparing the first variation indicator to a second variation indicator and a third variation indicator stored in a second data structure, the second data structure comprising:
      a mapping of the second variation indicator to a first reference break-even time; and
      a mapping of the third variation indicator to a second reference break-even time;
   responsive to the comparison, determining a power control break-even time accounting for the leakage power behavior of the processor core indicated by the first variation indicator by interpolating between the first and second reference break-even times; and
   applying a particular power management mode to the processor core based on the power control break-even time determined for the processor core.

2. The method of claim 1 further comprising:
   updating the power control break-even time for applying the particular power management mode to the processor core when the processor core changes performance level.

3. The method of claim 2, wherein updating the break-even time comprises:
   updating the power control break-even time for applying the particular power management mode to the processor core when the processor core changes performance level and when no other processor cores are active.

4. The method of claim 1, further comprising:
   determining an expected idle time of the processor core.

5. The method of claim 4, wherein applying the particular power management mode comprises:
   applying the particular power management mode to the processor core when the expected idle time is less than the power control break-even time of the processor core.

6. The method of claim 5, wherein applying the particular power management mode comprises:
   gating a clock associated with the processor core; and
   powering off the processor core.

7. The method of claim 1, further comprising determining the second variation indicator via a simulation account for a shutdown action, a wakeup action, or both.

8. A system comprising:
   a multicore processor comprising a first processor core and a second processor core;
   a memory in communication with the first and second processor cores;
   a variation monitor circuit operable to:
      measure a first variation indicator of the first processor core, wherein the first variation indicator is indicative of leakage power behavior of the first processor core;
      measure a second variation indicator of the second processor core, wherein the second variation indicator is indicative of leakage power behavior of the second processor core; and
      store the first and second variation indicators in a first data structure; and
   a power manager circuit operable to:
      compare the first variation indicator to an array of variation indicators stored in a second data structure, the second data structure comprising a mapping of the array of variation indicators to an array of reference break-even times, the second data structure mapping the array of variation indicators to the multicore processor, the second data structure different from the first data structure;
      compare the second variation indicator to the array of variation indicators;
      responsive to the comparison of the first variation indicator to the array of variation indicators, assign a first power control break-even time to the first processor core, the first power control break-even time accounting for the leakage power behavior of the first processor core indicated by the first variation indicator;
      responsive to the comparison of the second variation indicator to the array of variation indicators, assign a second power control break-even time to the second processor core, the second power control break-even time accounting for the leakage power behavior of the second processor core indicated by the second variation indicator;
      identify an expected idle time of the first processor core or the second processor core, or both; and
      apply a particular power management mode to the first processor core or the second processor core, or both based on the expected idle time and the first and second power control break-even times.

9. The system of claim 8, wherein the power management circuit is further operable to:
   determine when no other processor cores other than the second processor core are active in the multicore processor, and in response:

update the second power control break-even time for applying the particular power management mode when the second processor core changes performance level.

10. The system of claim 8, wherein the power management circuit is operable to apply the particular power management mode by gating a clock associated with the first processor core without powering off the first processor core, gating a clock associated with the second processor core without powering off the second processor core, gating the clock associated with the first processor core and powering off the first processor core, gating the clock associated with the second processor core and powering off the second processor core, or any combination thereof.

11. The system of claim 8, further comprising:
a memory in communication with the first processor core and the second processor core; and
when the expected idle time of the first processor core is greater than the first power control break-even time, the power management circuit is operable to apply the particular power management mode to the first processor core by:
saving content of the memory; and
powering off the memory.

12. The system of claim 8, further comprising:
a memory in communication with the first processor core and the second processor core; and
when the expected idle time of the second processor core is greater than the second power control break-even time, the power management circuit is operable to apply the particular power management mode to the second processor core by:
saving content of the memory; and
powering off the memory.

13. The system of claim 8, wherein the variation monitor circuit comprises a silicon performance monitor.

14. The system of claim 8, wherein the power manager circuit is configured to:
determine when the second processor core transitions from an active state to an inactive state; and
responsive to the determination, update the first power control break-even time for applying the particular power management mode when the first processor core changes performance level.

15. A system comprising:
a processor core;
evaluation circuitry in communication with the processor core, the evaluation circuitry operable to:
obtain a first evaluation of variation of the processor core operating at a first performance level, wherein the first evaluation of variation is indicative of leakage power behavior of the processor core operating at the first performance level; and
store the first evaluation of variation;
compare the first evaluation of variation to an array of variation indicators in a mapping of the array of variation indicators to an array of reference timing thresholds;
responsive to the comparison, interpolate between multiple selected ones of the reference timing thresholds to determine a first power control timing threshold for the first performance level from the first evaluation, the first power control timing threshold accounting for the leakage power behavior of the processor core operating at the first performance level; and
power control circuitry in communication with the processor core, the power control circuitry operable to:
obtain an expected idle time for the processor core; and
determine an applicable power saving mode for the processor core based on the expected idle time and the first power control timing threshold.

16. The system of claim 15, wherein the power control circuitry is operable to determine the applicable power saving mode by determining whether the expected idle time exceeds the first power control timing threshold.

17. The system of claim 15, further comprising a silicon performance monitor in communication with the processor core.

18. The system of claim 15, wherein:
the evaluation circuitry is further operable to:
obtain a second evaluation of variation of the processor core operating at a second performance level, wherein the second evaluation of variation is indicative of the leakage power behavior of the processor core operating at the second performance level; and
determine a second power control timing threshold for the second performance level from the second evaluation, the second power control timing threshold accounting for the leakage power behavior of the processor core operating at the second performance level; and
the applicable power saving mode for the processor core is determined based on:
the expected idle time and the first power control timing threshold when the processor core is operating at the first performance level; and
the expected idle time and the second power control timing threshold when the processor core is operating at the second performance level.

19. The system of claim 15, wherein:
the applicable power saving mode is selected to minimize power consumption of the processor core over the expected idle time.

20. The system of claim 15, wherein:
the applicable power saving mode is selected to minimize power consumption of the processor core over the expected idle time, including power cost for: stopping the processor core, restarting the processor core, saving a memory state, or any combination thereof.

* * * * *